United States Patent [19]

Okina et al.

[11] Patent Number: 4,576,855
[45] Date of Patent: Mar. 18, 1986

[54] COATING COMPOSITION AND SKINNED POLYURETHANE FOAM ARTICLES COATED THEREWITH

[75] Inventors: Toyohiko Okina, Anjo; Hiroshi Goto, Gifu; Akimasa Ozawa, Ichinomiya; Kenji Nakamura, Hirakata; Hiroshi Oishi, Kyoto, all of Japan

[73] Assignees: Inoue MTP Co., Ltd., Nagoya; Sanyo Chemical Industries, Ltd., Kyoto, both of Japan

[21] Appl. No.: 504,736

[22] Filed: Jun. 16, 1983

[30] Foreign Application Priority Data

Jul. 22, 1982 [JP] Japan ................ 57-128375

[51] Int. Cl.$^4$ .................. B32B 3/26; B32B 7/10; B32B 27/40
[52] U.S. Cl. .................. 428/215; 428/318.6; 428/318.8; 428/423.3
[58] Field of Search ............ 264/46.6; 428/215, 318.4, 428/318.6, 318.8, 423.3

[56] References Cited

U.S. PATENT DOCUMENTS

| | | | |
|---|---|---|---|
| 2,893,063 | 7/1959 | Hoppe | 264/45.3 |
| 3,311,527 | 3/1967 | Urbanic et al. | 428/90 |
| 3,328,225 | 6/1967 | Urbanic et al. | 428/252 |
| 3,473,951 | 10/1969 | De Rossi et al. | 428/318.8 |
| 3,586,649 | 6/1971 | Cobbledick | 428/318.8 |
| 3,873,407 | 3/1975 | Kumata et al. | 428/318.6 |
| 3,887,735 | 6/1975 | Laberinti | 428/316.6 |
| 4,209,564 | 6/1980 | Nomura et al. | 428/318.8 |
| 4,455,340 | 6/1984 | Okina | 428/318.6 |

FOREIGN PATENT DOCUMENTS 53-91998 8/1978 Japan .
1307876 2/1973 United Kingdom .

*Primary Examiner*—William J. Van Balen
*Attorney, Agent, or Firm*—Oblon, Fisher, Spivak, McClelland & Maier

[57] ABSTRACT

Coating composition and skinned polyurethane foam articles coated with such composition, wherein the composition composed of a combination of [I] a two component type non-yellowing polyurethane, for top coat, comprising a OH-terminated urethane prepolymer and a non-aromatic polyisocyanate, and [II] a two component type polyurethane, for under coat, comprising an NCO-terminated urethane prepolymer and a polyol.

23 Claims, No Drawings

COATING COMPOSITION AND SKINNED POLYURETHANE FOAM ARTICLES COATED THEREWITH

BACKGROUND OF THE INVENTION

1. Field of the Invention

This invention relates to a coating system, which is particularly useful for coating skinned polyurethane foam articles, and skinned polyurethane foam articles coated therewith.

2. Description of the Prior Art

There have heretofore been developed skinned polyurethane foam articles (hereinafter referred to as "skin foams"), such as integral skin foams or self-skin foams obtained by integral skin process, and those produced by mold coat process, wherein coating compositions are applied on the interior surface of the mold cavity followed by foaming urethane foam-forming mixtures.

There have been proposed, as such coating compositions used in the mold coat process, non-yellowing linear polyurethane solutions, two component-type polyurethanes, combinations of these, and combinations of non-reactive non-yellowing linear polyurethane solutions with polyisocyanates. Among these coating compositions, non-yellowing linear polyurethane solutions provide skins having poor resistance to solvents. On the other hand, two component-type polyurethanes, proposed heretofore, have disadvantages that the resulting skins at early stage are brittle and have insufficient strength and tendency to be broken at the time of demolding, and that longer demolding time is required.

SUMMARY OF THE INVENTION

Accordingly, it is an object of the present invention to provide a coating system which can form a coat having an improved solvent resistance.

It is another object of this invention to provide a coating system, which is particularly useful in the mold coat method and can provide higher skin strength at early stage and shorter demolding time.

Still another object of the invention is to provide a skin foam which has non-yellowing polyurethane skin exhibitting an improved solvent resistance and can be demolded within a shorter period of time.

Briefly, these and other objects of the present invention as hereinafter will become more readily apparent have been attained by using a coating system composed of a combination of the following [I] and [II]:

[I] a two component type non-yellowing polyurethane solution, for top coat, comprising (a) at least one OH-terminated urethane prepolymer having a hydroxyl-equivalent of at least 1,400 derived from at least one non-aromatic polyisocyanate and excess of at least one polyol, and (b) at least one non-aromatic polyisocyanate; and

[II] a two component type polyurethane, for under coat, comprising (c) at least one NCO-terminated urethane prepolymer derived from at least one polyol and at least one aromatic polyisocyanate, and (d) at least one polyol.

DETAILED DESCRIPTION OF THE PREFERRED EMBODIMENTS

[I] Two Component Type Non-yellowing Polyurethane, for Top Coat (a) OH-Terminated Urethane Prepolymer The non-aromatic polyisocyanates, used for producing said OH-terminated urethane prepolymer (a) constituting [I], are polyisocyanates, all NCO groups of which are attached to non-aromatic hydrocarbon radicals (non-bezenoid carbon atoms), and include aliphatic polyisocyanates, cycloaliphatic polyisocyanates, and araliphatic polyisocyanates. Illustrative examples of suitable polyisocyanates are:

(i) aliphatic polyisocyanates having 2–12 carbon atoms (except carbon atoms in NCO groups), such as ethylene diisocyanate, tetramethylene diisocyanate, hexamethylene diisocyanate (HDI), dodecamethylene diisocyanate, 1,6,11-undecane triisocyanate, 2,2,4-trimethyl hexane diisocyanate, lysine diisocyanate, 2,6-diisocyanato methyl caproate, bis(2-isocyanatoethyl)-fumarate, bis(2-isocyanatoethyl)carbonate, 2-isocyanatoethyl-2,6-diisocyanato hexanoate, and the like;

(ii) cycloaliphatic polyisocyanates having 4–15 carbon atoms, such as isophorone diisocyanate (IPDI), dicylohexylmethane diisocyanate (hydrogenated MDI), methylcyclohexylene diisocyanate (hydrogenated TDI), bis(2-isocyanatoethyl)4-cyclohexene-1,2-dicarboxylate, and the like;

(iii) araliphatic polyisocyanates having 8–15 carbon atoms, such as xylylene diisocyanate, diethyl benzene diisocyanate, and the like;

(iv) modified polyisocyanates of the above polyisocyanates (i), (ii) and (iii), containing carbodiimide-, uretdione-, urethaneimine-, urea-, biuret-, isocyanurate-groups, and the like, such as water-modified HDI, trimer of IPDI, and the like; and (v) combinations of two or more of the above polyisocyanates.

Among these, preferred are aliphatic polyisocyanates particularly HDI, and cycloaliphatic polyisocyanates especially IPDI and hydrogenated MDI.

Said OH-terminated urethane prepolymer (a) may be produced by reacting said non-aromatic polyisocyanate with one or more polyols. The polyols include low molecular weight polyols, high molecular weight polyols, and combinations of them. Suitable examples of low molecular weight polyols include diols, such as ethylene glycol, propylene glycol, 1,4-butane diol, 1,6-hexane diol, neopentyl glycol, diethylene glycol, cyclohexylene glycol, bis(hydroxymethyl)cyclohexane, bis(hydroxyetnyl)benzene, and the like; triols, such as glycerol, trimethylol propane, trimethylol ethane, 1,2,6-hexane triol, and the like; and polyols having 4 or more hydroxyl groups, such as pentaerythritol, diglycerol, methyl glucoside, sorbitol, sucrose, and the like.

The high molecular weight polyols include, for example, polyether polyols, polyester polyols, polybutadiene polyols, hydrogenated polybutadiene polyols, acrylic polyols, polymer polyols, and the like.

Illustrative of such polyether polyols are alkylene oxide adducts of polyfunctional compounds having at least two active hydrogen atoms, such as polyhydric alcohols, polyhydric phenols, polycarboxylic acids and amines. Suitable polyhydric alcohols include, for example, diols, such as ethylene glycol, propylene glycol, 1,4-butane diol, 1,6-hexane diol, neopentyl glycol, diethylene glycol, bis(hydroxymethyl)cyclohexane and bis(hydroxyethyl)benzene, triols, such as glycerol, trimethylol propane, trimethylol ethane and 1,2,6-hexane triol; polyols having 4 or more hydroxyl groups, such as pentaerythritol, methylglucoside, diglycerol, sorbitol, sucrose, and the like. Examples of suitable polyhydric phenols are mononuclear polyhydric phenols, such as hydroquinone, catechol, resorcin and pyrogallol; and polynuclear polyhydric phenols, such as bisphenols (bisphenol A, bisphenol F and the like). Suitable amines are inclusive of aliphatic polyamines, such as ethylenediamine, trimethylenediamine, hexamethylenediamine and diethylenetriamine; heterocyclic polyamines, such as piperazine and N-aminoethylpiperazine; aromatic polyamines, such as tolylenediamine, phenylenediamine, xylylenediamine, diphenylmethanediamine and polyphenylmethanepolyamines; alicyclic polyamines, such as cyclohexylenediamine, dicyclohexylmethanediamine and isophoronediamine; ammonia; alkanol amines, such as mono-, di- and tri-ethanolamines, propanolamines and butanolamines; and primary monoamines (aliphatic, aralkyl, aromatic), such as methylamine, ethylamine, isopropylamine, butylamine, benzylamine, aniline, toluidine and naphthylamine. Illustrative of suitable polycarboxylic acids are aliphatic polycarboxylic acids, such as succinic acid, glutaric acid, adipic acid sebacic acid, maleic acid, fumaric acid, itaconic acid and dimer acids; and aromatic polycarboxylic acids, such as phthalic acid, terephthalic acid and trimellitic acid. Two or more of the above polyfunctional active hydrogen-containing compounds may be used. Suitable examples of the alkylene oxide reacted with the active hydrogen-containing compounds are ethylene oxide, propylene oxide, 1,2- 2,3- 1,3-butylene oxides, tetrahydrofuran, styrene oxide and epichlorhydrin, and two or more of the alkylene oxides. In case of adding two or more kinds of alkylene oxides, block-addition, random-addition or combination of them may be employed. Among these alkylene oxides, preferred are propylene oxide and/or ethylene oxide. Combinations of propylene oxide and/or ethylene oxide with a minor proportion of other alkylene oxides (such as butylene oxides, tetrahydrofuran, styrene oxide) may be used. In view of reactivity, particularly preferred is combination of propylene oxide and ethylene oxide. Addition of the alkylene oxides to the active hydrogen-containing compounds can be carried out in the usual way, with or without catalysts (such as alkaline catalysts, amine catalists and acidic catalysts), under normal or elevated pressure. Ring-opening polymerization products of alkylene oxides, such as polytetramethyleneetherglycols formed by ring-opening polymerization of tetrahydrofuran followed by hydrolysis, may also be used. Among these polyether polyols, preferred are polyoxypropylene polyols, polyoxyethyleneoxypropylene polyols [block-addition (such as tripped and balanced) and/or random-addition products], polytetramethyleneether glycols, and mixtures of them. More preferred are those having primary hydroxyl groups (primary hydroxyl content of at least 30% especially 50-100%).

The polyester polyols include condensed polyester polyols, obtained by polycondensation of polycarboxylic acids with polyols; polylactone polyols, obtained by ring-opening polymerization of lactones, and polycarbonate polyols (diols). Exemplary of the polycarboxylic acids are aliphatic polycarboxylic acids such as succinic acid, glutaric acid, adipic acid, sebacic acid, azelaic acid, fumaric acid, maleic acid, itaconic acid, dimer acids (such as dimerzed rinoleic acid) and the like; and aromatic polycarboxylic acids such as phthalic acid, isophthalic acid, terephthalic acid, and the like. Examples of suitable polyols for producing the polyester polyols are low molecular weight polyols, such as those mentioned above, polyether polyols, as mentioned above (such as triethylene glycol-polyethylene glycols, and the like), and combinations of them. Illustrative examples of condensed polyester polyols are polyethyleneadipates, polyethylenebutyleneadipates, polybutyleneadipates, polydiethyleneadipates, and the like. Suitable lactones include, for example ε-caprolactone. Exemplary of suitable polylactone polyols are polycaprolactone diols.

The polymer polyols may be produced by in-situ polymerization of vinyl monomers in polyols, such as the above-mentioned polyether polyols, polyester polyols, mixtures of them and mixtures thereof with low molecular weight polyols as above. Examples of suitable vinyl monomers are acrylic monomers such as acrylonitrile, methylmethacrylate, aromatic vinyl monomers such as styrene, aliphatic hydrocarbon monomers such as butadiene, and the like, and combinations of two or more of them. Preferred are acrylonitrile and combination thereof with styrene.

Preferable OH equivalent weight of the high molecular weight polyol is 200–2500 particularly 250–1500.

Among these polyols for producing the prepolymer (a), preferred are high molecular weight polyols (especially polyether polyols, polyester polyols, and mixtures of them), and combinations thereof with low molecular weight polyols.

In case the high molecular weight polyols are used in conjunction with the low molecular weight polyols, the ratio can vary widely according to the properties required to the skin, but the weight ratio of the high molecular weight polyols to the low molecular weight polyols is usually 1:0–1:3, preferably 1:0.05–1:1.5.

Average OH equivalent weight of the polyols (total) is generally 70–1000, preferably 100–500. Average functionality of the polyols is usually 2–3, preferably 2.01–2.5.

If desired, the polyols may be used in conjunction with a minor amount (for example, up to 0.2 equivalent per 1 equivalent of the polyols) of one or more other active hydrogen atom-containing compounds, such as polyamines, aminoalcohols, and the like. Examples of suitable polyamines include non-aromatic (aliphatic, cycloaliphatic and aralipatic) polyamines, having a molecular weight of preferably 60–300: such as ethylene diamine, tetramethylene diamine, hexamethylene diamine; 4,4'-diaminocyclohexyl methane, 1,4-diaminocyclohexane, 4,4'-diamino-3,3'-dimethylcyclohexyl methane, isophorone diamine; and xylylene diamine, and the like. Suitable examples of the aminoalcohols are alkanol amines, such as mono- and di-ethanol amines, propanol amines, and the like.

In producing said OH-terminated urethane prepolymers (a) from the non-aromatic polyisocyanates and excess of the polyols, the ratio of the polyisocyanates to the polyols can vary widely, but the equivalent ratio of NCO groups to active hydrogen atom-containing groups (hydroxyl groups and optionally the other hydrogen atom-containing groups) is usually 1:1.0–1:1.3 preferably 1:1.03–1:1.1.

The prepolymer (a) can be prepared by reacting the polyisocyanates with the polyols (and optionally the other active hydrogen atom-containing compounds), either at one time; or step-wise, for instance, by reacting a part of the polyols (for example, high molecular weight polyols) with the polyisocyanates and then reacting the resulting NCO-terminated prepolymers with the rest of the polyols (for example, low molecular weight polyols) to form the OH-terminated prepolymers (a), by reacting the polyols with a part of the polyisocyanates and subsequently reacting the resulting intermediates having OH groups with the balance of the polyisocyanates to form the OH-terminated prepolymer (a), or combinations of these methods. In general, the reaction forming the prepolymer may be performed at a temperature between room temperature and 140° C., preferably 80°–120° C. The reaction can be carried out in a solvent, such as dimethyl formamide, dioxane, toluene, xylene, methyl isobutyl ketone, cellosolve acetate, and the like. The OH-terminated urethane prepolymer (a) has OH equivalent weight of usually at least 1,400, preferably 1,800–15,000, more preferably 2,000–10,000. By using OH-terminated prepolymer (a) having an equivalent weight of 1,400 or more, skin strength at early stage and demoldability can be remarkably improved. Molecular weight of the prepolymer (a) is usually 2,800–45,000, preferably 5,000–30,000. Prepolymers having molecular weights higher than 45,000 provide such viscous solutions that they must be diluted with a larger amount of solvents.

(b) Non-aromatic Polyisocyanate

As the non-aromatic polyisocyanate (b), there may be enumerated aliphatic, cycloaliphatic and araliphatic polyisocyanates, and modified polyisocyanates of them, mentioned above as the raw materials of the prepolymer (a). These polyisocyanates may be used in the form of NCO-terminated prepolymers, obtained by reacting excess of the non-aromatic polyisocyanates with polyols (particularly low molecular weight polyols). Examples of the polyols are the same as those described in the above OH-terminated prepolymer (a). NCO content of the NCO-terminated prepolymer is, for instance, 5–35% preferably 10–25%. It is preferable to use, as at least a part of the non-aromatic polyisocyanates, those having 3 or more NCO groups, for example, polyisocyanates containing urea- and biulet-groups obtained from 3 moles of non-aromatic polyisocyanates (such as HDI) and 1 mole of water, NCO-terminated low molecular weight prepolymers prepared by reacting low molecular weight polyols having three or more hydroxyl groups (such as trimethylol propane) with non-aromatic polyisocyanates in such an amount providing NCO/OH ratio of at least 2/1. Average functionality of the non-aromatic polyisocyanates (b) is 2.5–3. Such polyisocyanates are particularly useful, when the OH-terminated prepolymer (a) is linear.

In the two component type non-yellowing polyurethane [I], the ratio of the OH-terminated urethane prepolymer (a) to the non-aromatic polyisocyanate (b) can vary widely, but the ratio of NCO groups of (b) to OH groups of (a) is generally 1–5, preferably 1–3. Preferred average functionality of the total of OH groups of (a) and NCO groups of (b) is 2.05–3.5 especially 2.25–3.

In the non-yellowing polyurethane [I], (a), or (a) and (b) are usually used in the form of solutions in organic solvents. Illustrable examples of suitable solvents include ketones such as acetone, methyl ethyl ketone, methyl isobutyl ketone, and the like; hydrocarbons such as toluene, xylene, n-hexane, and the like; esters such as ethyl acetate, butyl acetate, cellosolve acetate, and the like; ethers such as tetrahydrofurane, dioxane, and the like; and mixtures of two or more of these solvents. The amount of the solvent is not particularly critical and may vary widely. In general, the solvent may be used in such an amount to provide concentration of (a) of 20–80% (by weight), preferably 30–60%. Viscosity of the solution is usually 500–30,000 cps, preferably 2,000–10,000 cps (at 25° C.). Concentration of (b) is generally 20–100% preferably 50–100%.

The polyurethane [I] may contain, if necessaly, additives, for example, colorants, such as pigmints (carbon black and the like) and dyes, catalysts such as those described bellow in [II], (e), surfactants, defoamers, fillers, and so on. These additives may be added to any of (a) or (b), or both. The amounts of these additives are not particularly critical and may vary over a wide range. Illustrative amounts of these additives are, for instance, Colorant: 0–40% (preferably 0–20%)
Filler: 0–40% (preferably 0–20%)
Catalyst: 0–5% (preferably 0–1%)
Surfactant: 0–5% (preferably 0–1%)
Defoamer: 0–5% (preferably 0–1%)
Stabilizer: 0–5% (preferably 0.2–2%)

[II] Two Component Type Polyurethane for Under Coat (c) NCO-Terminated Urethane Prepolymer Examples of suitable aromatic polyisocyanates, employed for producing said NCO-terminated urethane prepolymer (c) constituting [II], include monomuclear- and polynuclear-aromatic polyisocyanates having 6–15 carbon atoms (except carbon atoms in NCO groups) such as tolylene diisocyanate (TDI), crude TDI, diphenylmethane diisocyanate (MDI), crude MDI or polyphenylmethane polyisocyanates (PAPI), naphthylene diisocyanate and the like, and modified polyisocyanates of these polyisocyanates containing carbodiimide-, uretdione-, urethaneimine-, urea-, biuret-, isocyanurate-groups and the like, such as carbodiimide-modified MDI.

Illustrative of suitable polyols are high molecular weight polyols and low molecular weight polyols, and combinations of them, as mentioned in [I] as the starting materials of the prepolymer (a). Among these polyols, preferred are polyether polyols and polyester polyols. Preferred OH equivalent weight of the polyol is 200–2,500, more preferably 250–1,500. Average functionality of the polyols is usually 2–3, preferably 2–2.5.

In producing the NCO-terminated prepolymer (c), the ratio of the aromatic polyisocyanate to the polyol can vary widely, but NCO/OH ratio is usually at least 2, preferably at least 5, more preferably 8–17. NCO-content of the prepolymer (c) is generally 5–25% preferably 10–20%.

(d) Polyol

Exemplary of suitable polyols (d) used in combination with (c) in [II] are high molecular weight polyols and low molecular weight polyols, described in [I] as the raw materials of (a). Average equivalent weight of the polyols (d) is usually 50–500 preferably 100–350. As the polyols (d), combinations of high molecular weight polyols and low molecular weight polyols may be used and are preferred. The ratio of the high molecular weight polyol to the low molecular weight polyol can be varied over a wide range, but preferred weight ratio is 1:0–1:3 (especially 1:0.05–1:1.5). If desired, the polyol may be used in conjunction with minor amount (for instance, upto 0.2 equivalent per 1 equivalent of the polyol) of other active hydrogen-containing compounds, such as polyamines, aminoalcohols and the like. Suitable polyamines include, for example, non-aromatic polyamines, as mentioned in [I]; and aromatic polyamines, such as diphenylmethane diamine, dichlorodiphenyl methane diamine, benzidine, phenylene diamine, tolylene diamine, diethyl tolylene diamine, and the like. Examples of suitable aminoalcohols are mono- and di-ethanolamines, propanol-amines, and the like.

In the two component type polyurethane [II], the ratio of (c) to (d) may vary widely, but the equivalent ratio of NCO /active hydrogen atom-containing groups (OH and optionally the other active hydrogen atom-containing groups) is usually 0.8–1.2, preferably 1–1.1.

The two component type polyurethane [II] may contain any urethane catalyst (e), promoting the reaction between NCO groups and OH groups. Suitable examples of such catalyst (c) include amine catalysts, such as triethylene diamine, N,N-dimethyl cyclohexyl amine, trimethyl amine, triethyl amine, N-ethyl morpholine, 1,8-diazabicyclo(5,4,0)undecene-7 (DBU, produced by San-Abott, Ltd.), diethyl ethanol amine, and the like; organic tin catalysts, such as dibutyl tin dilaurate, dioctyl tin dimaleate, stannous octoate, dibutyl tin oxide, bis(tri-n-butyl)tin oxide, and the like; other methalic catalysts, such as lead octoate, lead naphthenate, potassium octoate, tetrabutyl titanate, and the like. Preferred catalysts are organic tin catalysts and combinations thereof with amine catalysts (particularly triethylene diamine). The amounts of the catalysts may be varied according to the kinds thereof, but generally at least 0.001%, preferably 0.03–0.3% based on the total weight of the components (c) and (d). The organic tin catalysts provide good curability; but it is preferred to use the tin catalysts in an amount of 0.15% or less, since these catalysts cause reduction of heat resistance when used in too much amounts. The catalysts (e) may be added to the component (c) or (d) or both, but it is preferable to add (e) to the component (c).

In addition to the components (c), (d) and optionally (e), the two component type polyurethane [II] may contain, if desired, other components, solvents and additives such as coloring agents, stabilizers (such as anti-oxidants), foam stabilizers, defoamers, fillers, and so on. Examples of suitable solvents are the same as written in [I]. The amount of the solvent is not particularly restricted, but it is preferable to use in such an amount providing a solution having a solid concentration of at least 40% by weight. Suitable colorants include, for example, pigments (such as carbon black) and dyes. Illustrative of suitable stabilizers are benzotriazols, benzoates, hindered phenols, phosphites, piperidines. Suitable foam stabilizers include silicone surfactants such as siloxane-oxyalkylene block copolymers. Examples of suitable defoamers include dimethylsiloxane and the like. Exemplary of the fillers are calcium carbonate, tarc, barium sulfate, and the like. These additives may be added to any of the components (c) and (d), on both. The amounts of these additives are not particularly critical. For example, the amounts of these additives may be the same as illustratively described in [I].

The coating systems according to the present invention, composed of combinations of [I] comprising (a) and (b) with [II] comprising (c) and (d), are particularly useful as coating agents (skin-forming agents) for skin foams (especially those by mold coat process).

The coating systems may be applied to any polyurethane foams, including flexible, semi-rigid and rigid foams. Preferred are flexible foams and semi-rigid foams.

The coating systems of this invention can be applied by any of the conventional techniques, including applying directly on the substrates (integral skin foams), or by applying on the interior surfaces of molds in which urethane polymers (foam-forming mixtures) are subsequently introduced and foamed (mold coat method). Other application techniques will be obvious to those skilled in the art.

In using the coating systems, according to the present invention, as skin-forming agents for mold coat skin foams, [I] and [II] may be applied to the mold cavity by conventional methods, preferably by spraying.

The two component type non-yellowing polyurethane solution [I] is usually produced by mixing the OH-terminated prepolymer (a) in the form of solution with the non-aromatic polyisocyante (b) in predetermined proportion. The two component type non-yellowing polyurethane solution [I] is applied on the interior surface of the mold to form top coat or outer later of the akin foam. The solution may be applied twice or more. Subsequently, the two component type polyurethane [II], before it cures, is applied to the mold cavity which is already covered with the top coat of [I]. The polyurethane [II] may be applied either immediately after [I] is applied, or after the top coat layer is dried or cured completely or partly. It is preferred to apply [II] onto the top coat layer [I] in semi-dried or semi-cured state.

The amounts of [I] and [II] applied onto the inner surface of the mold may vary over a wide range according to the properties desired. In general, the thickness of the top coat or outer layer of [I] is at least 0.01 mm preferably 0.02–0.06 mm, and that of the under coat or intermediate layer is at least 0.05 mm preferably 0.1–2 mm.

Temperature of the mold may vary widely, and is usually 30°–80° C. preferably 40°–60° C.

The urethane foam-forming mixture is introduced into the mold cavity after inner surface of the mold is coated with [I] and subsequently [II]; preferably before the intermediate layer of [II] is cured complelty.

The urethane foam-forming mixture in this invention is the same as in conventional formulations for polyurethane foams. The mixture generally comprises a polyol, an organic polyisocyanate, a foaming agent, a catalyst, a foam stabilizer and other auxiliary agents such as a coloring agent, a flame retardant or a filler. These compounds are not specifically limited. They may be selected from known components for urethane foams.

Representatives of suitable polyols include high molecular weight polyols, low molecular weight polyols, and combinations of them as enumerated above in [I] as the raw materials of (a). Among these, preferred are high molecular weight polyols (particularly polyether polyols, polyester polyols and polymer polyols), and combinations of these high molecular weight polyols with low molecular weight polyols. The polyols may be used in conjunction with other active hydrogen atom-containing compounds, such as polyamines and aminoalcohols, described above in [II] (d). The equivalent weight (average) of the polyols (and optionally the other active hydrogen atom-containing compounds) is usually 70–5,000 preferably 300–3,000 more preferably 1,000–2,000. The weight ratio of the low molecular weight polyol (and optionally the other hydrogen atom-containing compounds) to the high molecular weight polyols can vary widely, and is usually 0:100–300:100 preferably 0.5:100–100:100 more preferably 1:100–20:100.

Examples of suitable polyisocyanates are non-aromatic polyisocyanates (aliphatic, cycloaliphatic and araliphatic polyisocyanates) and aromatic polyisocyanates, mentioned above in [I] and [II], respectively and combinations of two or more of them. Among these, preferred are aromatic ones, particularly MDI (crude MDI) and TDI.

Examples of suitable foaming agents (blowing agents) are water, halogenated hydrocarbons (such as trichloro-monofluoro-methane and the like) and combinations of them. The amount of the foaming agents may vary over a wide range, but it is preferred to use in such an amount providing a free-rise density of 0.01–0.4 g/cm$^3$ especially 0.02–0.2 g/cm$^3$ more particularly 0.07–0.15 g/cm$^3$.

Exemplary of the foam stabilizers are the known silicone derivatives and various mixtures of surface active agents. Amounts of these agents may be the same as in conventional formulations for polyurethane foams.

The preferable foam-forming mixture is a formulation for the so-called cold mold polyurethane foams which can expand without heating.

The amount of the foam-forming mixture, charged into the mold cavity, may vary widely, according to the properties required. The mixture can be over-packed usually 100–800% (degree of compression 1–8), preferably 110–500%, more preferably 150–300%.

The urethane foam-forming mixture, charged into the mold cavity, is allowed to form and cured at ambient or elevated temperature. The resulting skin foam is removed from the mold. The foam may be cured at ambient or elevated temperature.

Over all density of the skin foam formed according to this process may vary over a wide range, for instance, 0.05–0.8 g/cm$^3$, preferably 0.1–0.5 g/cm$^3$, more preferably 0.12–0.35 g/cm$^3$.

Any conventional mold having a mold cavity of a predetermined shape may be used. The mold cavity is preferably treated with a proper release agent, before applying the coating systems [I] and [II]. The mold is preferably maintained at an elevated temperature (such as upto 100° C.) during the operation of the process.

The coating system composed of [I] and [II] according to the present invention has, as compared with known coating systems, advantages as follows. Both the top coat and under coat formed from [I] and [II] of this invention have excellent solvent-resistance and adhesion at various temperatures and humidity ranges, as well as good physical properties such as flexibility, elongation and so on; while non-yellowing linear polyurethane solutions and combinations of linear polyurethane solution (for top coat) with two component type polyurethanes (for under coat) result in skins (top coat layers) of poor solvent-resistance (particularly to alcohols) and poor adhesion, composed of soluble linear polyurethanes; and, by using combinations of non-yellowing non-reactive linear polyurethane solutions with polyisocyanates (or low molecular weight NCO-terminated prepolymers), which are cured with moisture in the air forming urea linkage between the polyisocyanates each other, solvent-resistance may be somewhat improved but is not fully satisfied, and formation of hard and brittle urea-containing polymers causes reduction of properties such as flexibility and elongation. Besides, outer layers formed according to the present invention using two component type non-yellowing polyurethane solutions [I] comprises OH-terminated prepolymers (a) and non-aromatic polyisocyanates (b) attain sufficient strength within a short period of time, and demolding time is remarkably shortened; whereas outer layers formed from conventional two component type polyurethanes (or solutions) comprising polyols (such as polyether polyols and polyester polyols and the like) and polyisocyanates (or NCO-terminated prepolymers) are of poor initial strength and brittle at early stage, and therefore show tendency to be broken at demolding and require longer demolding time. Moreover, the coating systems of this invention have appropriate reactiveity and good sprayability and are able to provide uniform spray coat and films (skins) of uniformity; while use of reaction mixtures comprising nonaromatic polyisocyanates, high molecular weight polyols (such as polyester polyols and polyether polyols) and nonaromatic polyamines (one-shot method and prepolymer method) bings about immediate reaction (too rapid formation of high polymer) during or just after mixing, because of extremely high reactivity of the polyamines, and results in poor sprayability.

In addition, according to the coating systems of the present invention, by using the two-component type polyurethane [II], there can be attained considerable reduction of the amounts of the expensive non-yellowing polyurethanes and improvement of skin properties, and there can be prevented worsening of appearance caused by coarsing of surface of foams introduced afterward. Furthermore, there can be obtained skin foams having sufficient physical properties, even when inexpensive raw materials for foams are used and even when foam density is reduced.

Skin foams formed from the coating systems according to the present invention are useful in various fields of application, for instance, products in road and rail vehicles and watercrafts (including amtomobiles, bicycles, streetcars, snow mobiles, motor boats, and the like), such as seat frames and panels, interior trims and parts, exterior trim parts, and the like; and furnishings such as furniture, ornaments, and the like.

Having generally described the invention, a more complete understanding can be obtained by reference to certain specific examples, which are included for purposes of illustration only and are not intended to be limiting unless otherwise specified.

In the examples, parts and ratio designate parts by weight and weight ratio, respectively.

Prepolymers used in the following examples were prepared as follows:

Prepolymers A-1, A-2 and A-3

Raw materials written in Table I were charged into four-necked reaction vessels, and reacted under a nitrogen atmosphere at 100° C. for 6 hours to obtain OH-terminated urethane prepolymers having solid-content, viscosity, OH number (as solid) and OH equivalent weight, as written in Table I.

Prepolymers C-1 and C-2

Raw materials written in Table II were charged into four-necked reaction vessels, and reacted under a nitrogen atomosphere at 60° C. for 3 hours to obtain NCO-terminated urethane prepolymers having NCO-content written in Table II.

TABLE I

| Prepolymer | A - 1 Parts | A - 2 Parts | A - 3 Parts |
| --- | --- | --- | --- |
| Polycaprolactonediol[1] | 604 | — | — |
| Polyethylenebutyleneadipate[2] | — | 750 | — |
| Polybutyleneadipate[3] | — | — | 800 |
| 1,4-Butane diol | 244 | 216 | 144 |
| Trimethylol propane | 13 | 40 | 71 |

TABLE I-continued

| Prepolymer | A - 1 Parts | A - 2 Parts | A - 3 Parts |
|---|---|---|---|
| IPDI | 646 | 666 | 643 |
| Methyl isobutyl ketone | 1,130 | 1,254 | 1,244 |
| Toluene | 1,130 | 1,254 | 1,244 |
| Dibutyl tin dilaurate | 0.2 | 0.25 | 0.25 |
| Stabilizer[4] | 6 | 6.7 | 6.7 |
| Solid content, % | 40.1 | 40.0 | 40.1 |
| Viscosity, cps at 25° C. | 3,100 | 6,000 | 4,000 |
| OH number | 18.5 | 10.3 | 20.0 |
| OH equivalent weight | 3,032 | 5,447 | 2,800 |

[Notes]
[1]OH number 56,
[2]OH number 45,
[3]OH number 112,
[4]1/1 mixture of Tinuvin 328 and Irganox 1010 (benzotriazole type and hindered phenol type, respectively, produced by Ciba-Geigy)

TABLE II

| Prepolymer | C - 1 | C - 2 |
|---|---|---|
| Polyethylenebutyleneadipate, parts[1] | 1,947 | 510 |
| 4,4'-MDI, parts[2] | 1,953 | — |
| Isonate 143 L, parts | — | 1,303 |
| NCO content, % | 15.0 | 18.5 |

[Notes]
[1]OH number 45,
[2]Modified MDI (produced by The Upjohn Co.)

EXAMPLE 1

[I] Top Coat

A two component type non-yellowing polyurethane solution of the following composition was used for top coat.

| | | | Parts |
|---|---|---|---|
| (a) | { | Prepolymer A - 1 | 100 |
| | | Carbon Black | 1.2 |
| | | Methyl ethyl ketone | 80 |
| (b) | | Coronate HL* | 5.5 |

[Note]
*adduct of trimethylol propane with 3 moles of HDI, produced by Nippon Polyurethane Ind. Co. Ltd.

[II] Under Coat

A two component type polyurethane of the following composition was used for under coat.

| | | | Parts |
|---|---|---|---|
| (c) | { | Prepolymer C - 1 | 100 |
| | | Ethyl acetate | 25 |
| (d) | | Polyols | 100 |
| | |   Polyethylenebutyleneadipate (OH-No. 45) | 83.7 |
| | |   Diethylene glycol | 11.8 |
| | |   Trimethylol propane | 4.5 |
| | | Catalyst* | 0.4 |
| | | Stabilizer** | 0.8 |
| | | Ethyl acetate | 25 |

[Notes]
*9/1 mixture of triethylene diamine and dibutyl tin dilaurate
**1/1 mixture of Yoshinox BB(hindered phenol type, produced by Yoshitomi Phemaceutical Industries, Ltd.) and Sanol LS-770 (piperidine type, produced by Sankyo Co. Ltd.)

[III] Production of Skin Foam

An electroformed mold having grain patterns was coated with a releasing agent and maintained at 50° C. The above non-yellowing polyurethane solution [I] was applied with a spray gun on the interior surface of the mold, and dried for 2 minutes to make a top coat or outer layer 0.03 mm thick. Then, the above polyurethane [II] was applied with a spray gun on the top coat layer so as to form an under coat or intermediate layer of 0.3 mm thickness. Subsequently, before the under coat layer cured completely, a urethane foam-forming mixture of the following formulation was introduced into the cavity of the mold, which was then closed. The mixture was foamed in the mold cavity and allowed to stand for about 5 minutes, and then the resulting shaped product was demolded. There was obtained a skin foam having uniform and smooth surface and fine touch.

[Formulation of the Foam-Forming Mixture]

| | Parts |
|---|---|
| Sannix FA - 703* | 93 |
| Triethanol amine | 2 |
| Ethylene glycol | 5 |
| Water | 0.5 |
| Trichloromonofluoromethane | 10 |
| Triethylene diamine | 0.2 |
| Millionate MR** | 38 |

[Notes]
*polyoxypropyleneoxyethylene tetraol (OH-No. 37), produced by Sanyo Chemical Industries, Ltd.
**crude MDI produced by Nippon Polyurethane Ind. Co. Ltd.

EXAMPLE 2

[I] Top Coat

A two component type non-yellowing polyurethane solution of the following composition was used for top coat.

| | | | Parts |
|---|---|---|---|
| (a) | { | Prepolymer A - 2 | 100 |
| | | Carbon black | 1.2 |
| | | Methyl ethyl ketone | 100 |
| (b) | | Sumidur N-75* | 3 |

[Note]
*adduct of 1 mole of water with 3 moles of HDI, produced by Sumitono-Bayer Urethane Ind. Co. Ltd.

[II] Under Coat

A two component type polyurethane of the following composition was used for under coat.

| | | | Parts |
|---|---|---|---|
| (c) | { | Prepolymer C - 2 | 100 |
| | | Ethyl acetate | 25 |
| (d) | | Polyols | 113 |
| | |   Polyethylenebutylene adipate (OH-No. 110) | 103.3 |
| | |   1,4-Butane diol | 7.8 |
| | |   Trimethylol propane | 1.9 |
| | | Catalyst* | 2.2 |
| | | Stabilizer** | 0.8 |
| | | Ethyl acetate | 25 |

[Notes]
*1/1 mixture of triethylene diamine and dibutyl tin dilaurate
**same as in Example 1 [II]

[III] Production of Skin Foam

Example 1 [III] was repeated, using the above [I] and [II], except that the thickness of the top coat layer was 0.025 mm. There was obtained a skin foam having uniform and smooth surface and fine touch.

EXAMPLE 3

[I] Top Coat

A two component type non-yellowing polyurethane solution of the following composition was used for top coat.

|     |                     | Parts |
| --- | ------------------- | ----- |
| (a) | Prepolymer A - 3    | 100   |
|     | Carbon black        | 1.2   |
|     | Methyl ethyl ketone | 100   |
| (b) | Coronate HL         | 6     |

[II] Under Coat

A two component type polyurethane of the following composition was used for under coat.

|     |                     |        | Parts |
| --- | ------------------- | ------ | ----- |
| (c) | Prepolymer C - 2    |        | 100   |
|     | Ethyl acetate       |        | 20    |
| (d) | Polyols             |        | 62    |
|     | Polybutyleneadipate (OH-No. 108) | 52.7 | |
|     | Diethylene glycol   | 7.25   |       |
|     | Trimethylol propane | 2.05   |       |
|     | Catalyst*           |        | 0.16  |
|     | Stabilizer**        |        | 0.6   |
|     | Ethyl acetate       |        | 20    |

[Notes]
*same as in Example 2
**same as in Example 1

[III] Production of Skin Foam

Example 1 [III] was repeated, using the above [I] and [II], except that the thickness of the top coat layer was 0.025 mm. There was obtained a skin foam having uniform and smooth surface and fine touch.

COMPARATIVE EXAMPLE 1

A coating composition composed of the following components was used for top coat.

|                                       | Parts |
| ------------------------------------- | ----- |
| Non-yellowing linear polyurethane solution* | 100 |
| Carbon black                          | 1     |
| Stabilizer**                          | 0.12  |
| Methyl ethyl ketone                   | 200   |

[Notes]
*solution having 30,000 cps at 25° C. composed of 30% of polyurethane resin prepared by reacting isophorone diisocyanate with polybutylene adipate and isophorone diamine, 30% of toluene, 20% of methyl ethyl ketone and 20% of isopropyl alcohol.
**same as in Example 1

By similar method as in Example 1, the above coating composition was applied on the interior surface of the mold and dried for 3 minutes to form a top coat layer 0.05 mm thick. Then, the same two component type polyurethane as in Example 1 [II] was applied on the top coat layer so as to form an under coat layer of 0.3 mm thickness. Subsequently, before the under coat layer cured completely, the same urethane foam-forming mixture as in Example 1 was introduced into the mold cavity and foamed, by similar method to Example 1 [III]. There was obtained a skin foam having uniform and smooth surface and fine touch, but the skin foam was poor in solvent-resistance and adhesion.

Properties of skins of the skin foams, obtained in Examples 1–3 and Comparative Example 1, were tested, according to the following methods.

(1) Solvent-resistance

Using Gakushin type rubbing tester, the surface of the skin foam was abraded 100 times, under 500 g load, with white cotton cloth penetrated with each solvent, and degree of removal of the colorant from the skin to the white cotton cloth was observed.
⊚ No colorant is removed.
○ Little colorant is removed.
Δ Some amount of colorant is removed.
X Much colorant is removed.

(2) Scratch-resistance

Using Ueshima type scratch tester, degree of scratch was observed after transferring sidewards to one direction under 500 g load.
○ Scratch is not observed.

(3) Light-resistance

Using a Fade-O-meter, state of surface was observed after irradiation for 400 or 800 hours, under black panel temperature of 83±3° C.
⊚ No change of luster is observed.
○ Some change of luster is observed.
X Considerable change of luster is observed.

(4) Heat-resistance

Stage of surface is observed after heating in a Geer oven at 120° C. for 400 or 800 hours.
⊚ No change of luster is observed.
○ A little change of luster is observed.
Δ Some change of luster is observed.
X Considerable change of luster is observed.

(5) Adhesion

○ Good adhesion, skin is not stripped.
X Poor adhesion, stripping of skin is occurred.

The results were as shown in Table III

TABLE III

|                       | Example 1 | Example 2 | Example 3 | Comparative Example 1 |
| --------------------- | --------- | --------- | --------- | --------------------- |
| Solvent-resistance    |           |           |           |                       |
| to ethanol            | ○         | ○         | ○         | X                     |
| to hair conditioner*  | ⊚         | ⊚         | ⊚         | X                     |
| Scratch-resistance    | ○         | ○         | ○         | ○                     |
| Light-resistance      |           |           |           |                       |
| after 400 hrs.        | ⊚         | ○         | ○         | ○                     |
| after 800 hrs.        | ⊚         | ○         | ○         | X                     |
| Heat-resistance       |           |           |           |                       |
| after 400 hrs.        | ⊚         | ○         | ○         | Δ                     |
| after 800 hrs.        | ⊚         | ○         | ○         | X                     |
| Adhesion              | ○         | ○         | ○         | X                     |

[Notes]
*MG-5, produced by Shiseido

As apparent from Table III, compared with skin foams produced using non-yellowing linear polyurethane solutions, those produced using the coating systems according to the present invention have remarkably improved solvent-resistance and other properties, and can fulfil requirements for use in connection with interior and exterior trims in automobile and other vehicles.

COMPARATIVE EXAMPLE 2

A two component type non-yellowing polyurethane solution of the following composition was used for top coat.

|  | Parts |
|---|---|
| Polyethylenebutylene adipate (OH equivalent weight 1,575) | 150 |
| Coronate HL | 16 |
| Carbon black | 3.2 |
| Stabilizer* | 4.5 |
| Methyl ethyl ketone | 80 |

[Note]
*same as in Example 1

By the same method as in Example 1, the two component type polyurethane solution was applied on the interior surface of the mold and dried for 10 minutes to form a top coat layer 0.03 mm thick. Then, the same two component type polyurethane as in Example 1 [II] was applied on the top coat layer so as to form an under coat layer of 0.3 mm. Subsequently, before the under coat layer cured completely, the same urethane foam-forming mixture as in Example 1 was introduced into the mold cavity and foamed, by similar method to Example 1 [III]. After about 5 minutes, the foamed product was removed from the mold, but the skin was not sufficiently cured, a part of which was left on the interior surface of the mold, and the resulting skin foam had broken skin and bad appearance.

Apparent from the comparison of Examples with Comparative Example 2, coating systems of the present invention have attained a substantial inprovement in demoldability (shortened demold time), as compared with the prior art systems using conventional two component type polyurethanes.

What is claimed as new and desired to be secured by Letters Patent is:

1. A coating composition, which comprises a combination of:
   [I] a two component type non-yellowing polyurethane solution, for top coat, comprising (a) at least one OH-terminated urethane prepolymer having a hydroxyl-equivalent of at least 1,400 derived from at least one non-aromatic polyisocyanate and excess of at least one polyol, and (b) at least one non-aromatic polyisocyanate; and
   [II] a two component type polyurethane, for under coat, comprising (c) at least one NCO-terminated urethane prepolymer derived from at least one polyol and at least one aromatic polyisocyanate, and (d) at least one polyol.

2. The composition of claim 1, wherein the prepolymer (a) is derived from at least one polyol selected from the group consisting of high molecular weight polyols having a hydroxyl equivalent of 200-2500 and low molecular weight polyols, and at least one organic polyisocyanate having all its isocyanate groups attached to non-benzenoid carbon atoms, which polyisocyanate is selected from the group consisting of aliphatic polyisocyanates having 2-12 carbon atoms, cycloaliphatic polyisocyanates having 4-15 carbon atoms, araliphatic polyisocyanates having 8-15 carbon atoms and modified polyisocyanates of the above polyisocyanates.

3. The composition of claim 2, wherein said high molecular weight polyol is at least one selected from the group consisting of polyether polyols, polyester polyols, polybutadiene polyols, acrylic polyols and polymer polyols, wherein said polymer polyols are derived from vinyl monomers and polyols.

4. The composition of claim 1, wherein the prepolymer (a) is obtained by reacting said polyisocyanate with at least one high molecular weight polyol having a hydroxyl equivalent of 200-2500 and at least one low molecular weight polyol.

5. The composition of claim 1, wherein the prepolymer (a) is obtained by reacting said polyisocyanate and said polyol in such an amount providing an equivalent ratio of NCO groups to active hydrogen atom-containing groups of 1:1.01-1:1.3.

6. The composition of claim 1, wherein the prepolymer (a) has a hydroxyl equivalent of 1,800-15,000.

7. The composition of claim 1, wherein the polyisocyanate (b) is at least one organic polyisocyanate having all its isocyanate groups attached to non-benzenoid carbon atoms, which polyisocyanate is selected from the group consisting of aliphatic polyisocyanates having 2-12 carbon atoms, cycloaliphatic polyisocyanates having 4-15 carbon atoms, araliphatic polyisocyanates having 8-15 carbon atoms, modified polyisocyanates of the above polyisocyanates and NCO-terminated prepolymer derived from these polyisocyanates.

8. The composition of claim 1, wherein at least a part of the polyisocyanate (b) is a polyisocyanate having three or more isocyanate groups.

9. The composition of claim 1, wherein the equivalent ratio of the polyisocyanate (b) to the prepolymer (a) is 1:1-5:1.

10. The composition of claim 1, wherein the prepolymer (c) is obtained by reacting said polyisocyanate with at least one high molecular weight polyol having a hydroxyl equivalent of 200-2,500, selected from the group of polyether polyols, polyester polyols, polybutadiene polyols, acrylic polyols and polymer polyols, wherein said polymer polyols are derived from vinyl monomers and polyols, in such an amount providing an NCO/OH ratio of at least 2.

11. The composition of claim 1, wherein the polyol (d) is a mixture of at least one high molecular weight polyol having a hydroxyl equivalent of 200-3,000 and at least one low molecular weight polyol.

12. The composition of claim 1, wherein the two component type polyurethane [II] contains at least one catalyst for urethane reaction, selected from the group consisting of amine catalysts and organometalic catalysts.

13. The composition of claim 12, wherein said catalyst is at least one organo tin compound or a combination thereof with triethylenediamine.

14. The composition of claim 1, wherein [I] is used in such amount providing a top coat layer having an average thickness of 0.01-0.1 mm, and [II] is used in such amount providing an under coat layer having an average thickness of 0.05-3 mm.

15. A self-skinned polyurethane foam article having thereon a cured coating formed from the composition of claim 1.

16. The article of claim 15, wherein the cured coating comprises:
   (1) a top coat having an average thickness of 0.01-0.1 mm, formed from said two-component type non-yellowing polyurethane [I]; and (2), an under coat having an average thickness of 0.05–3 mm, formed from said two-component type polyurethane [II].

17. A skin urethane foam, which comprises:

(1) a cover layer of substantially solvent-insoluble non-yellowing polyurethane, having an average thickness of 0.01–0.1 mm, formed by applying to the mold cavity a two component type non-yellowing polyurethane solution comprising (a) at least one OH-terminated urethane prepolymer having a hydroxyl-equivalent of at least 1,400 derived from at least one non-aromatic polyisocyanate and excess of at least one polyol and (b) at least one non-aromatic polyisocyanate, and curing the non-yellowing polyurethane;

(2) an intermediate layer applied onto the cover layer and formed from a two component type polyurethane comprising (c) at least one NCO-terminated urethane prepolymer derived from at least one polyol and at least one aromatic polyisocyanate and (d) at least one polyol; and (3) a polyurethane foam layer formed by introducing a urethane foam-forming mixture into the mold cavity onto the intermediate layer before the intermediate layer cures completely, and allowing the urethane foam-forming mixture to foam, whereby the resulting foam is integrally bound to the cover layer through the intermediate layer.

18. The foam of claim 17, wherein said intermediate layer has an average thickness of 0.05–3 mm.

19. The foam of claim 17, wherein said polyurethane foam is a flexible foam or semi-rigid foam.

20. The foam of claim 17, wherein said polyurethane foam layer is formed from urethane foam-forming mixtures having a free rise density of 0.01–0.4 g/cm$^3$.

21. The foam of claim 17, which has an over-all density of 0.05–0.8 g/cm$^3$.

22. The composition of claim 1, wherein the prepolymer (a) is derived from at least one polyol, the average functionality of which is 2–3.

23. The composition of claim 1, wherein the average functionality of the total of the OH groups of (a) and the NCO groups of (b) is 2.05–3.5.

* * * * *

UNITED STATES PATENT AND TRADEMARK OFFICE
CERTIFICATE OF CORRECTION

PATENT NO. : 4,576,855

DATED : March 18, 1986

INVENTOR(S) : Toyohiko Okina, et al

It is certified that error appears in the above-identified patent and that said Letters Patent is hereby corrected as shown below:

-- The Applicants information is incorrect and should read as follows:

3rd inventor Akimasa Kozawa, Aichi-Ken, JAPAN --

Signed and Sealed this

Eleventh Day of November, 1986

*Attest:*

DONALD J. QUIGG

*Attesting Officer*  *Commissioner of Patents and Trademarks*